(12) United States Patent
Vajapeyam et al.

(10) Patent No.: US 8,489,100 B2
(45) Date of Patent: Jul. 16, 2013

(54) UPLINK POWER CONTROL IN LONG TERM EVOLUTION NETWORKS

(75) Inventors: Madhavan Srinivasan Vajapeyam, San Diego, CA (US); Tingfang Ji, San Diego, CA (US); Hao Xu, San Diego, CA (US); Aleksandar Damnjanovic, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 289 days.

(21) Appl. No.: 13/084,409

(22) Filed: Apr. 11, 2011

(65) Prior Publication Data

US 2011/0250899 A1  Oct. 13, 2011

Related U.S. Application Data (60) Provisional application No. 61/323,754, filed on Apr. 13, 2010.

(51) Int. Cl.
*H04W 36/00* (2009.01)

(52) U.S. Cl.
USPC .......................................... 455/444; 455/522

(58) Field of Classification Search
None
See application file for complete search history.

(56) References Cited

U.S. PATENT DOCUMENTS

| | | | |
|---|---|---|---|
| 6,707,806 B1 | 3/2004 | Kato | |
| 8,260,341 B2 * | 9/2012 | Shin et al. | 455/522 |
| 2008/0280638 A1 | 11/2008 | Malladi et al. | |
| 2009/0252075 A1 * | 10/2009 | Ji et al. | 370/312 |
| 2011/0170496 A1 * | 7/2011 | Fong et al. | 370/329 |

FOREIGN PATENT DOCUMENTS

| | | |
|---|---|---|
| WO | 2008101056 | 8/2008 |
| WO | 2010018909 A1 | 2/2010 |
| WO | 2010035966 A2 | 4/2010 |

OTHER PUBLICATIONS

International Search Report and Written Opinion—PCT/US2011/032353—ISA/EPO—Jul. 29, 2011.
Simonsson A et al: "Uplink Power Control in LTE—Overview and Performance, Subtitle: Principles and Benefits of Utilizing rather than compensating for SINR Varitations",Vehicular Technology Conference, 2008.VTC 2008— FALL.IEEE 68th,IEEE, Piscataway,NJ,USA,Sep. 21, 2008,pp. 1-5, XP031352500,ISBN: 978-1-4244-1721-6 the whole document.

* cited by examiner

*Primary Examiner* — Tu X Nguyen
(74) *Attorney, Agent, or Firm* — Kenneth Vu (57) ABSTRACT

A method for power control in a long term evolution (LTE) network is disclosed and includes configuring a user equipment (UE) with a plurality of transmit power levels where each transmit power level corresponds to a subframe type. A first power level is used in subframes protected by cooperative coordination between base stations. A second power level corresponds to unprotected subframes. The method also includes scheduling the UE to transmit in accordance with the configured transmit power levels.

31 Claims, 7 Drawing Sheets

UPLINK POWER CONTROL IN LONG TERM EVOLUTION NETWORKS

CROSS-REFERENCE TO RELATED APPLICATION

This application claims the benefit under 35 U.S.C. §119 (e) to U.S. Provisional Patent Application Ser. No. 61/323,754 entitled METHOD AND APPARATUS FOR UPLINK POWER CONTROL IN LONG TERM EVOLUTION (LTE) NETWORKS, filed on Apr. 13, 2010, the disclosure of which is expressly incorporated by reference herein in its entirety.

BACKGROUND

1. Field

Aspects of the present disclosure relate generally to wireless communication systems, and more particularly to uplink power control in long term evolution.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to some aspects of the disclosure, a method for power control in a long term evolution (LTE) network includes configuring a user equipment (UE) with a plurality of transmit power levels. Each transmit power level corresponds to a subframe type. A first of the plurality of transmit power levels is used in subframes protected by cooperative coordination between base stations. A second of the transmit power levels corresponds to unprotected subframes. The method may also include scheduling the UE to transmit in accordance with the configured transmit power levels.

According to some aspects of the disclosure, a method for power control in a long term evolution (LTE) network includes maintaining a plurality of transmit power levels at a user equipment (UE). Each transmit power level corresponds to a subframe type. A first of the plurality of transmit power levels is used in subframes protected by cooperative coordination between base stations, and a second of the transmit power levels corresponds to unprotected subframes. The method may also include transmitting an uplink channel of the LTE network with one of the transmit power levels in accordance with a scheduled subframe type.

According to some aspects of the disclosure, an apparatus for power control in a long term evolution (LTE) network includes means for configuring a user equipment (UE) with a plurality of transmit power levels. Each transmit power level corresponds to a subframe type. A first of the plurality of transmit power levels is used in subframes protected by cooperative coordination between base stations, and a second of the transmit power levels corresponds to unprotected subframes. The apparatus may also include means for scheduling the UE to transmit in accordance with the configured transmit power levels.

According to some aspects of the disclosure, an apparatus for power control in a long term evolution (LTE) network includes means for means for maintaining a plurality of transmit power levels at a user equipment (UE), where each transmit power level corresponds to a subframe type. A first of the plurality of transmit power levels is used in subframes protected by cooperative coordination between base stations, and a second of the transmit power levels corresponds to unprotected subframes. The apparatus may also include means for transmitting an uplink channel of the LTE network with one of the transmit power levels in accordance with a scheduled subframe type.

According to some aspects of the disclosure, an apparatus for power control in a long term evolution (LTE) network includes a memory and at least one processor coupled to the memory where at least one processor is configured to configure a user equipment (UE) with a plurality of transmit power levels. Each transmit power level corresponds to a subframe type. A first of the plurality of transmit power levels is used in subframes protected by cooperative coordination between base stations. A second of the transmit power levels corresponds to unprotected subframes. The at least one processor is further configured to schedule the UE to transmit in accordance with the configured transmit power levels.

According to some aspects of the disclosure, an apparatus for power control in a long term evolution (LTE) network includes a memory and at least one processor coupled to the memory. At least one processor is configured to maintain a plurality of transmit power levels at a user equipment (UE), where each transmit power level corresponds to a subframe type. A first of the plurality of transmit power levels is used in subframes protected by cooperative coordination between base stations. A second of the transmit power levels corresponds to unprotected subframes. The at least one processor is further configured to transmit an uplink channel of the LTE network with one of the transmit power levels in accordance with a scheduled subframe type.

According to some aspects of the disclosure, a computer program product for power control in a long term evolution (LTE) network includes a computer-readable medium having a program code recorded thereon. The program code includes program code to configure a user equipment (UE) with a plurality of transmit power levels, where each transmit power level corresponds to a subframe type. A first of the plurality of transmit power levels is used in subframes protected by cooperative coordination between base stations. A second of the transmit power levels corresponds to unprotected subframes. The program code also includes program code to schedule the UE to transmit in accordance with the configured transmit power levels.

According to some aspects of the disclosure, a computer program product for power control in a long term evolution (LTE) network includes a computer-readable medium having a program code recorded thereon. The program code includes program code to maintain a plurality of transmit power levels at a user equipment (UE), where each transmit power level corresponds to a subframe type. A first of the plurality of transmit power levels is used in subframes protected by cooperative coordination between base stations. A second of the transmit power levels corresponds to unprotected subframes. The program code also includes program code to transmit an uplink channel of the LTE network with one of the transmit power levels in accordance with a scheduled subframe type.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
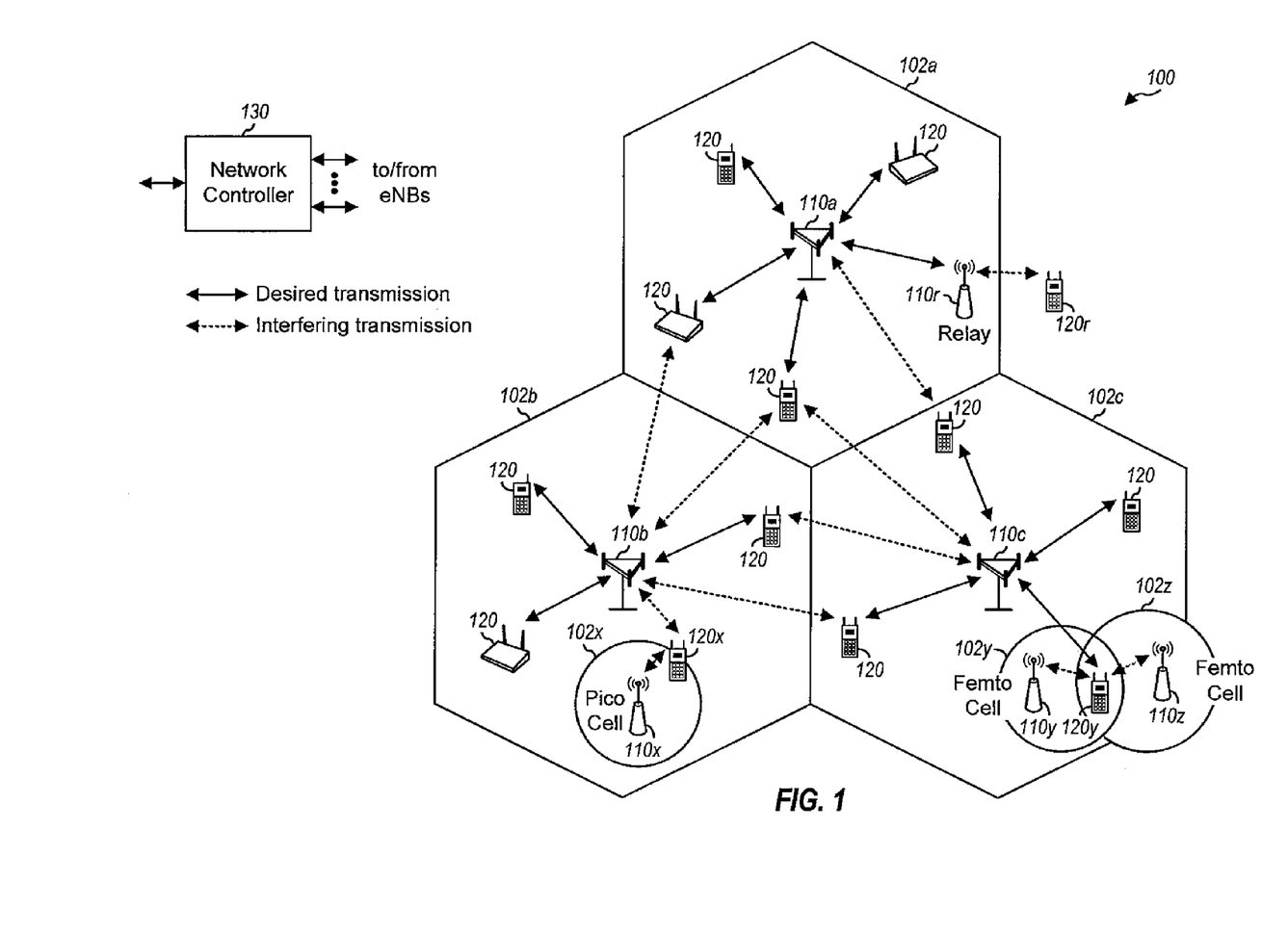
FIG. 1 is a block diagram conceptually illustrating an example of a telecommunications system.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. In addition, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. In addition, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous operation. For synchronous operation, the eNodeBs may have similar frame timing, and transmissions from different eNodeBs may be approximately aligned in time.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a tablet, a handheld device, a laptop computer, a cordless phone, a wireless local loop (WLL) station, tablet or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
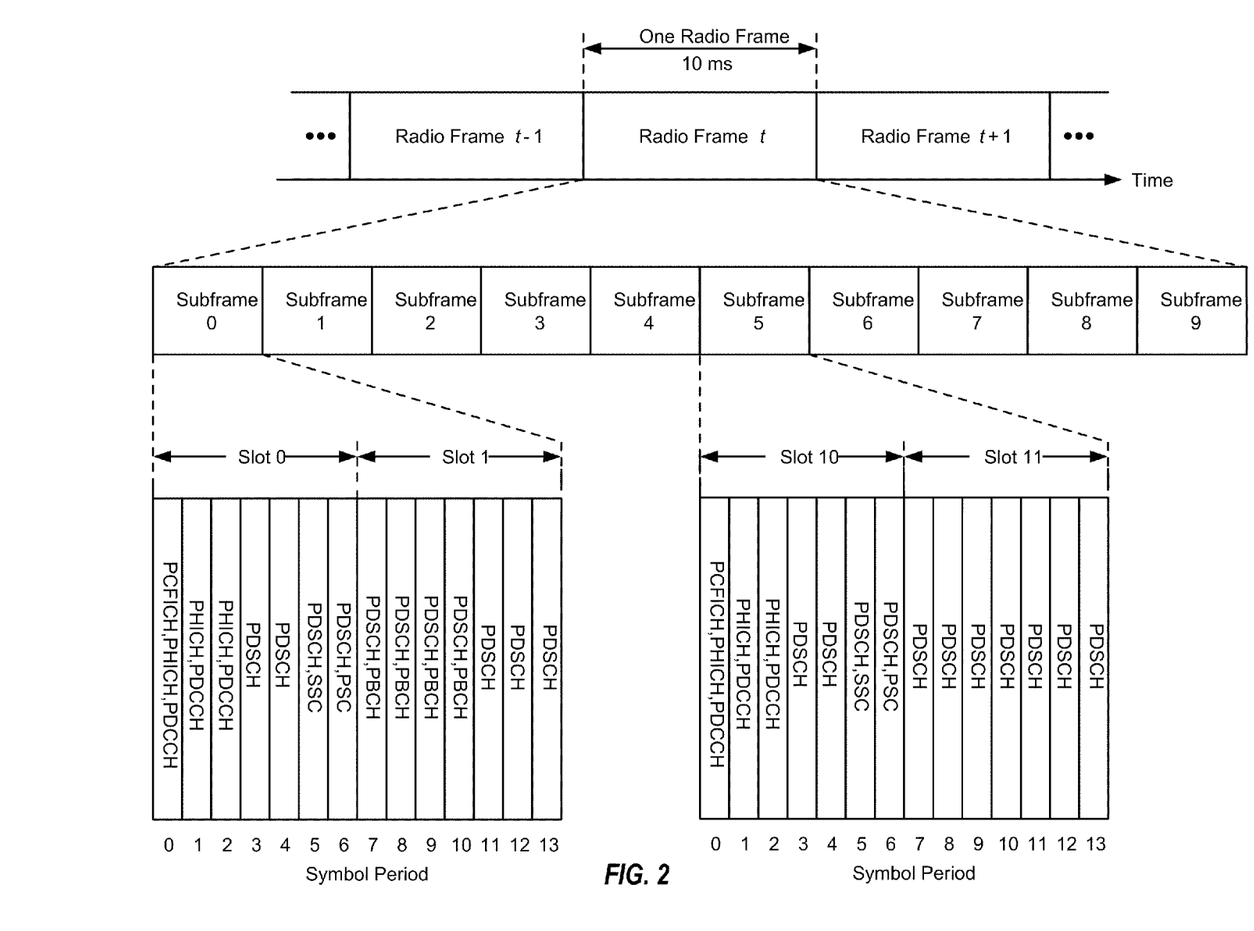
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
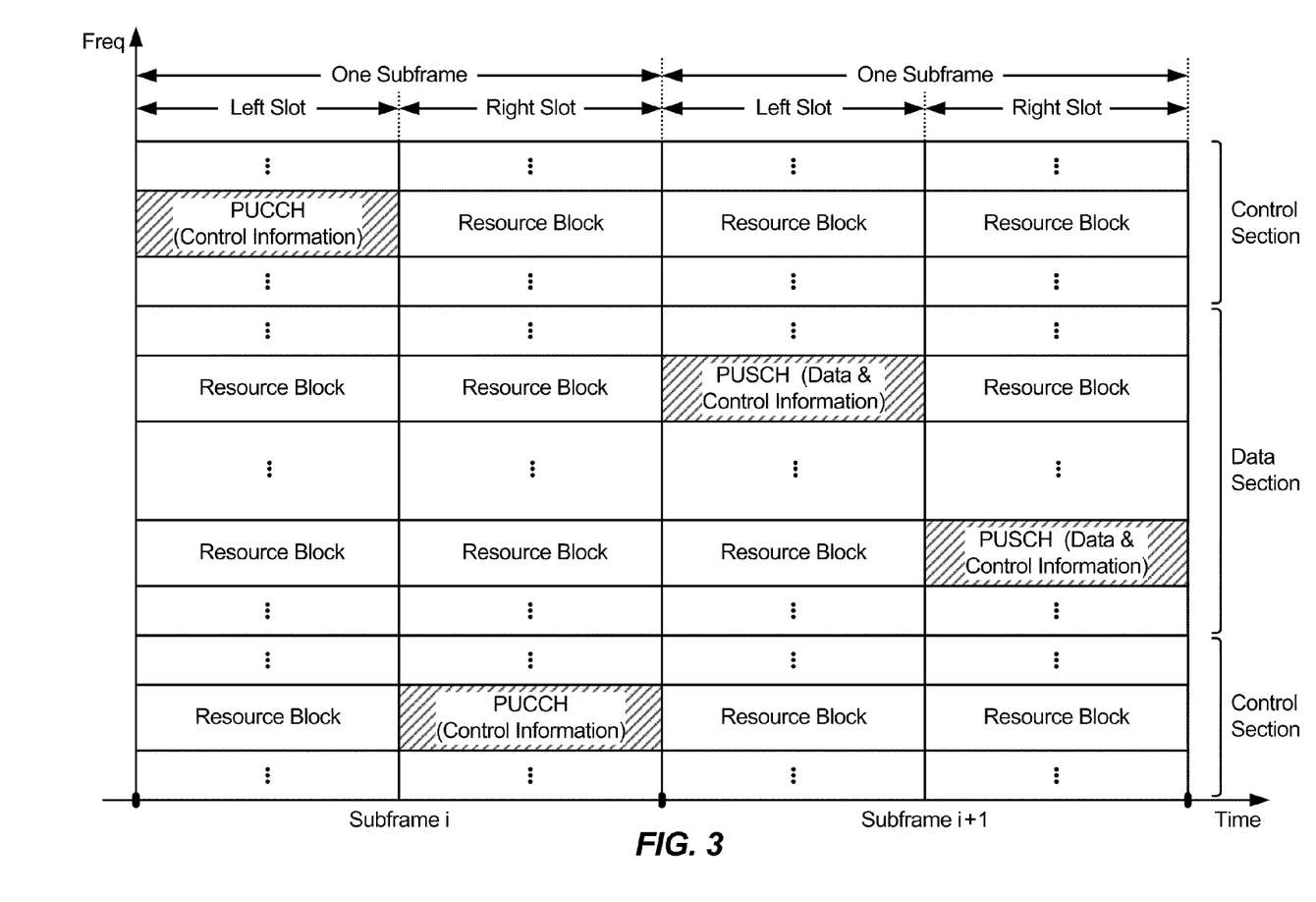
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
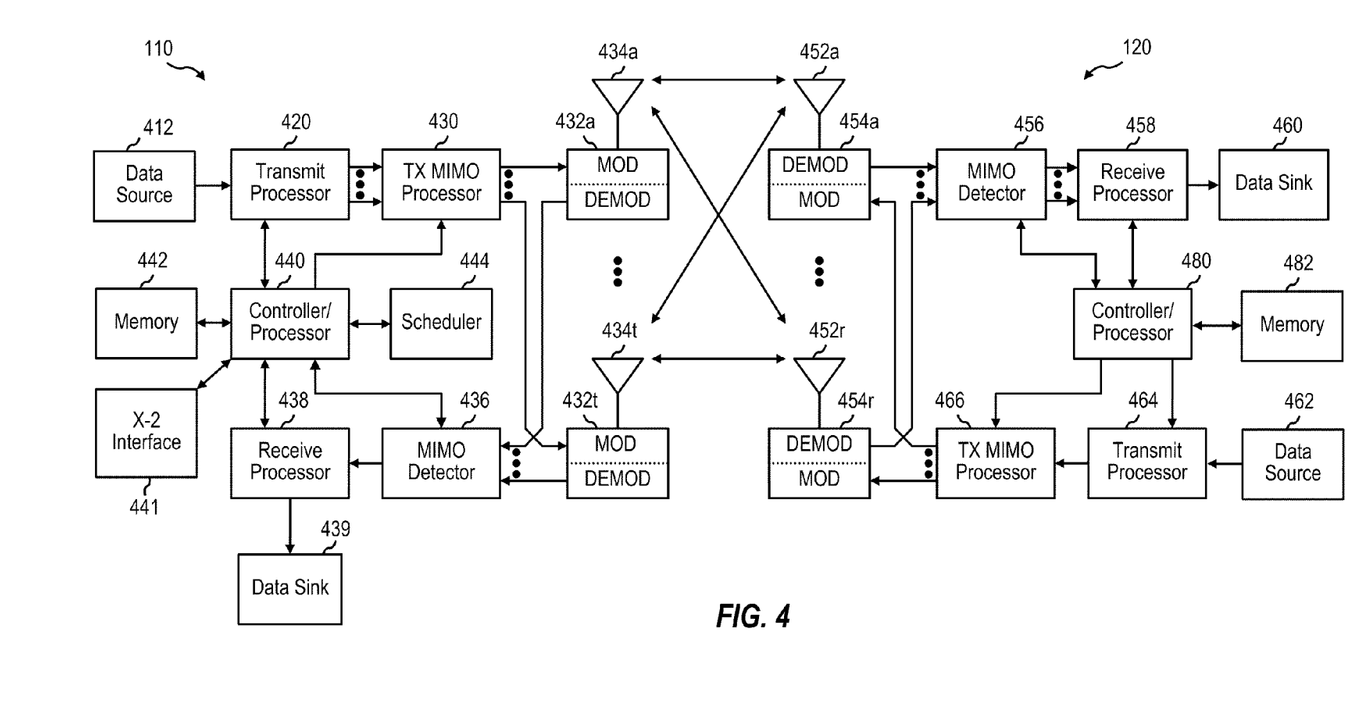
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIGS. 6-8, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
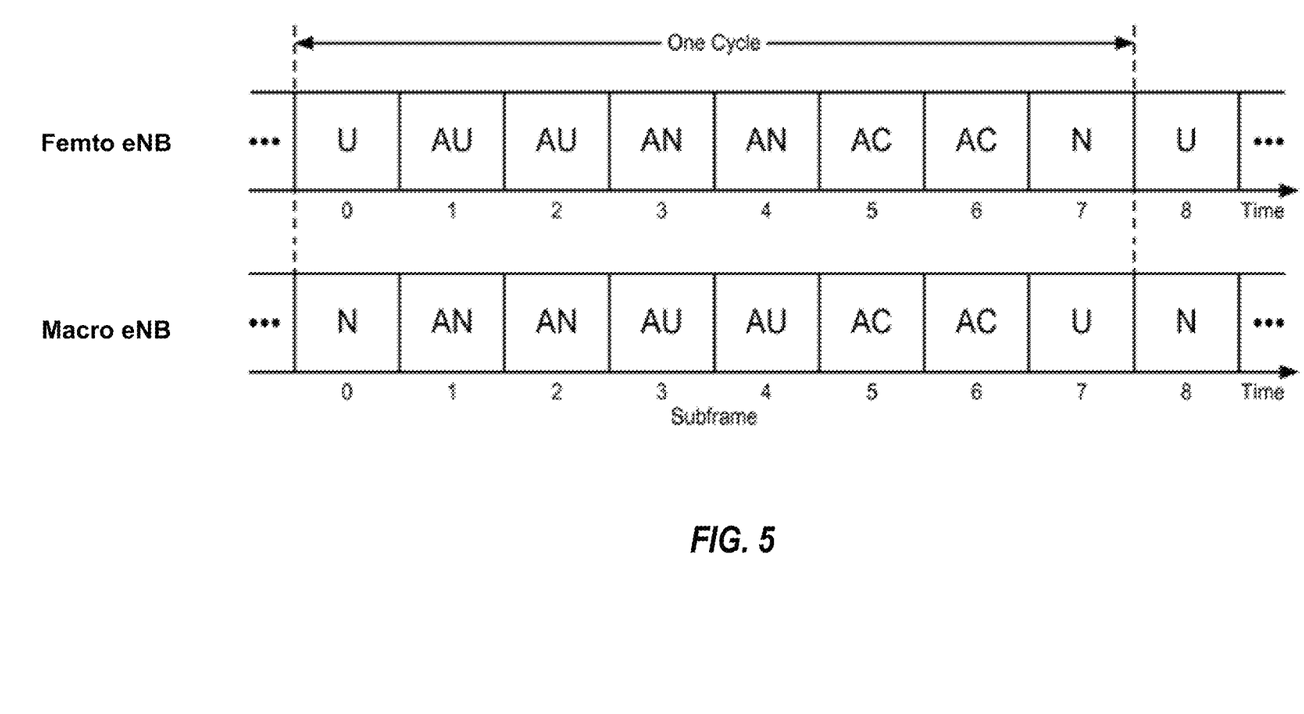
FIG. 5 is a block diagram conceptually illustrating adaptive resource partitioning in a heterogeneous network according to one aspect of the disclosure.

FIG. 5 is a block diagram illustrating TDM partitioning in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Uplink Power Control in Long Term Evolution (LTE) Networks

As discussed above, the eNodeB has a set of protected (P=U, AU) and unprotected (NP=N, AN, AC) subframes. However, the protected and unprotected subframes may raise new issues. For example, because power control commands are accumulated over time for every subframe, the interference on protected and unprotected subframes could be very different. Thus, a power control loop operating across all subframes may not converge. Alternatively, transmission power spectral density (PSD) is set conservatively. In addition, scheduling only on protected subframes could be suboptimal, with an eNodeB giving up ⅞ (87.5%) of capacity.

Conventionally, there are two power control approaches in LTE Release 8/9. The first approach controls a reference power spectral density (PSD) and the second approach controls the actual transmission PSD. In general, power control commands in Rel8/9 are accumulated over time for every subframe.

In the solution where a reference PSD is controlled, a delta_MCS parameter is employed. The transmit power control (TPC) commands control PSDs for a base modulation and coding scheme (MCS), but the actual PSD varies based on a scheduled modulation and coding scheme. The offset from the base modulation and coding scheme (delta_MCS) is not signaled to the UE, but rather is preset for each modulation and coding scheme.

In the solution where the transmission PSD is controlled, transmission power control (TPC) commands set the actual UE transmit power. The eNodeB selects the base modulation and coding scheme taking into account link quality, interference cancellation, and quality of service expectations.

According to one aspect of the present disclosure, multiple transmission power spectral density (PSD) set points are defined in the user equipment (UE) for data (e.g., PUSCH). The PSD set points are part of a single power control loop. The PSD set points may correspond to transmission power levels for a first type of subframes and a second type of subframes (for example, protected and unprotected sub frames). Thus, a UE may rapidly vary its transmission power level by receiving transmission power control (TPC) commands from an evolved Node B (eNodeB) and then set transmit power based on the PSD set point corresponding to the type of scheduled subframe (i.e., protected or unprotected). Because a single power control loop exists, the transmission power control (TPC) command is applied to both types (protected and unprotected) of subframes. In one aspect, the two PSD values differ by an offset, which could be a pre-configured value or could be adaptively adjusted with additional signaling. Multiple PSD set points may be used in both control reference PSD methods and control transmission PSD methods. Although only two set points for two types of subframes are described, the disclosure is also envisioned to operate with more than two types.

In an aspect for controlling the physical uplink shared channel (PUSCH), the UE may be instructed by the eNodeB to use the first PSD set point or the second PSD set point by receiving an extra bit during scheduling of uplink channel subframes. According to one aspect, the eNodeB indicates the PSD set point for use in a modified DCI format 0 message. That is, a '1' may indicate to the UE to use the first PSD set point and a '0' may indicate to the UE to use the second PSD set point. In another aspect, the UE changes interpretation of the transmission power control (TPC) field of a DCI format 0 message.

According to one aspect, one loop operates on the UE for controlling the value of the first and second PSD set points. The first and second PSD set points may be separated by an offset value. That is, the first PSD set point is lower (or higher) than the second PSD set point by an offset amount. According to one aspect, the offset value is adaptively adjusted. The offset amount in the UE may be varied by receiving commands from the eNodeB to increase or decrease the offset amount by positive or negative increments. According to another aspect, the offset value is pre-configured in the UE.

According to another aspect of PUSCH power control, the UE operates multiple (e.g., two) power control loops for controlling the value of the first PSD set point and the second PSD set point independently. In this aspect, the eNodeB may signal changes in the PSD set points of the UE through modified DCI format 3/3A messages and modified DCI format 0 messages. For example, the UE may interpret the transmission power control (TPC) field of the DCI format 0 message to indicate a new value for the first or second PSD set point. The multiple power control loop configuration can be applied to both the reference PSD and transmission PSD methods, similar to the single power control loop configuration discussed above.

The present disclosure also relates to power control for uplink control channels (e.g., PUCCH). In this aspect, the UE may maintain multiple (e.g., two) PSD set points differing by an offset value. A single power control loop can be employed. Similar to PDSCH power control, the offset can be a pre-configured value or could be adaptively adjusted with additional signaling.

According to one aspect, the power spectral density set point for transmitting over the PUCCH may be content dependent. For example, CQI reports may have a different power control settings than other content using the same PUCCH format. In another aspect, the UE receives upper layer messages that indicate whether to apply the offset value during transmission of scheduling request (SR) messages and/or channel quality indicator (CQI) messages. Alternatively, new PUCCH formats are defined including additional values for parameters Delta_F_PUCCH(F) and h(n_CQI, n_HARQ). In yet another aspect, the UE receives a downlink scheduling grant from the eNodeB indicating whether the offset value should be applied to acknowledgments (ACKs). For example, DCI format 1A/1B/1D/2A/2B messages may be modified to indicate whether the offset value is applied.

Similar to PDSCH power control, the UE may maintain two PSD set points independently. In this case, a new transmit power control (TPC) command format indicates TPC correction values. An additional bit informs the UE of which power value is to be corrected. In one aspect, the UE receives upper layer commands that indicates which PSD set point to apply when transmitting scheduling request (SR) messages and/or channel quality indicator (CQI) messages. In another aspect, the UE receives a downlink scheduling grant from the eNodeB indicating a PSD set point to use when transmitting ACKs on the PUCCH. For example, DCI format 1A/1B/1D/2A/2B messages may be modified to indicate which PSD set point to use.

Figure 6:
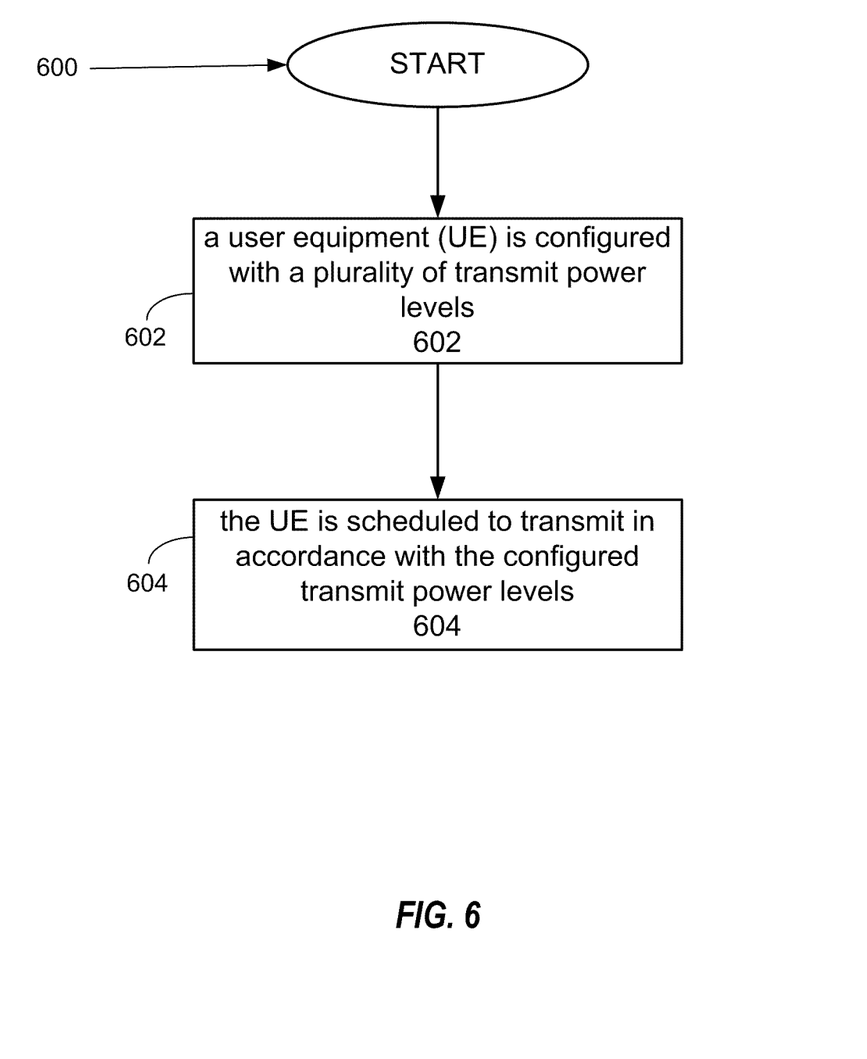
FIG. 6 shows a flow chart for operating a UE configured with a plurality of transmit power levels for transmitting on an uplink channel.

FIG. 6 shows a flow chart for operating a UE configured with a plurality of transmit power levels for transmitting on an uplink channel. The flow chart for operating the UE starts at block 600. At block 602, the UE is configured with a plurality of transmit power levels, each transmit power level corresponding to a subframe type. A first of the plurality of transmit power levels used in subframes protected by cooperative coordination between base stations, and a second of the transmit power levels corresponding to unprotected subframes. At block 604, the UE is scheduled to transmit in accordance with the configured transmit power levels. For example, if an assigned uplink channel subframe is a protected subframe, a first power level or PSD set point may be used for transmission. Alternatively, if the assigned uplink channel subframe is a non-protected subframe, a second power level or second PSD set point may be used for transmission.

According to yet another aspect, the UE has one power level or PSD set point and operates one power control loop for PUSCH transmission. The eNodeB decides in which type of subframe to run the power control loop. In this aspect, the UE receives a dynamic delta modulation and coding scheme (delta_MCS) value. When subframes are scheduled by the eNodeB, the eNodeB indicates to the UE the delta_MCS value for use in the scheduled subframes. Thus, a protected subframe could receive one delta_MCS value whereas an unprotected subframe may be scheduled with a different delta_MCS value. According to one aspect, the eNodeB notifies the UE by sending a modified DCI format 0 message indicating the delta_MCS value. This solution applies to the reference PSD method discussed above.

According to another aspect, the UE again has one power level or power level set point and operates one power control loop for PUSCH transmission. In this aspect, the UE maintains a delta_MCS back off value. The back off value can cause a power reduction or a power amplification. The UE may receive via upper layer signaling a beta offset value to define a delta_MCS back off applied to delta_MCS during non-protected subframes. When the UE receives an uplink scheduling assignment, the eNodeB notifies the UE whether to apply the back off value. In another aspect, during scheduling, the eNodeB may use an extra bit in the DCI format 0 message to indicate whether to activate the configured delta_MCS back off value. According to one aspect, the extra bit prevents protected subframes from being treated as non-protected subframes.

In one configuration, the eNodeB 110 is configured for wireless communication including means for configuring. In one aspect, the configuring means may be the controller/processor 440 and memory 442 configured to perform the functions recited by the configuring means. The eNodeB 110 is also configured to include a means for scheduling. In one aspect, the scheduling means may be the controller/processor 440, the scheduler 444 and the memory 442 configured to perform the functions recited by the scheduling means. In another aspect, the aforementioned means may be a module or any apparatus configured to perform the functions recited by the aforementioned means.

Figure 7:
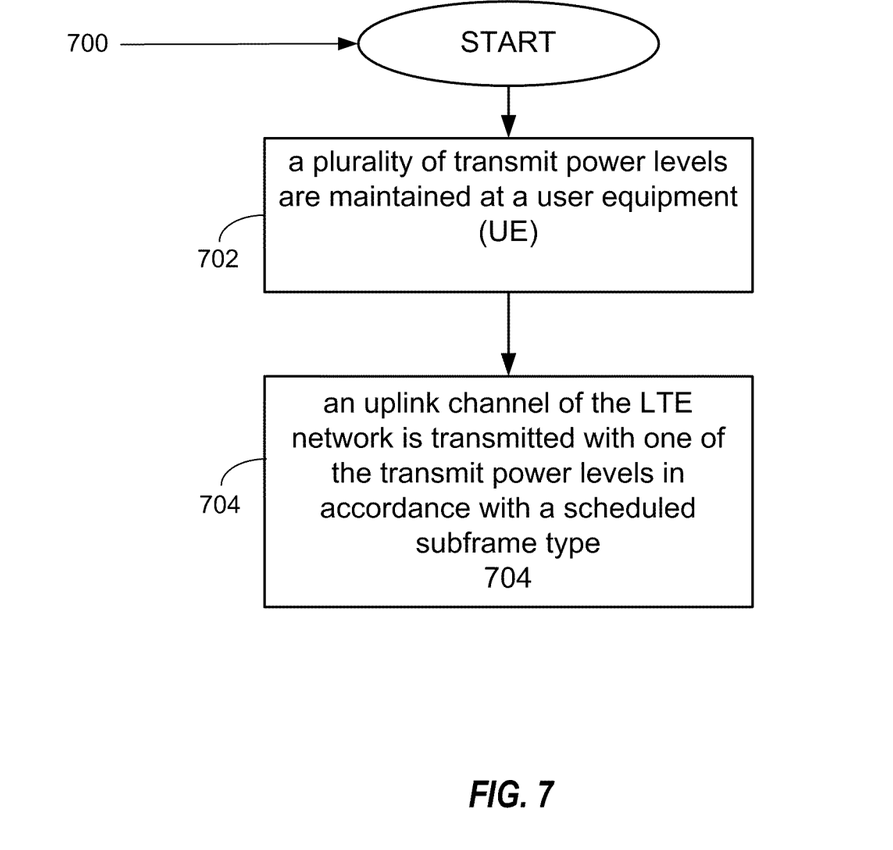
FIG. 7 shows a flow chart for controlling power in a UE based on plurality of transmit power levels for transmitting on an uplink channel.

FIG. 7 shows a flow chart for controlling power in a UE based on plurality of transmit power levels for transmitting on an uplink channel. The flow chart for controlling the UE starts at block 700. At block 702, the UE maintains a plurality of transmit power levels at a user equipment (UE), each transmit power level corresponding to a subframe type. A first of the plurality of transmit power levels used in subframes protected by cooperative coordination between base stations, and a second of the transmit power levels corresponding to unprotected subframes. At block 704, the UE transmitting an uplink channel of the LTE network with one of the transmit power levels in accordance with a scheduled subframe type.

In one configuration, the UE 120 is configured for wireless communication including means for maintaining. In one aspect, the maintaining means may be the controller/processor 480 and memory 482 configured to perform the functions recited by the maintaining means. The UE 120 is also configured to include a means for transmitting. In one aspect, the transmitting means may be the controller/processor 480, memory 482, the transmit processor 464, modulators 454a-r and antenna 452a-r configured to perform the functions recited by the transmitting means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but are to be accorded the widest scope consistent with the principles and novel features disclosed herein.

What is claimed is:

1. A method for power control in a long term evolution (LTE) network, comprising:
    configuring a user equipment (UE) with a plurality of transmit power levels, each transmit power level corresponding to a subframe type, a first of the plurality of transmit power levels used in subframes protected by cooperative coordination between base stations, and a second of the transmit power levels corresponding to unprotected subframes; and
    scheduling the UE to transmit in accordance with the configured transmit power levels.

2. The method of claim 1, further comprising configuring the UE based on a separate power control loop for each subframe type.

3. The method of claim 1, in which the configuring includes computing power control commands for each subframe type; and
    transmitting the computed power control commands to the UE in accordance with a scheduled subframe type.

4. The method of claim 1, in which the configuring includes indicating to the UE a transmit power set point based on subframe type.

5. A method for power control in a long term evolution (LTE) network, comprising:
    maintaining a plurality of transmit power levels at a user equipment (UE), each transmit power level corresponding to a subframe type, a first of the plurality of transmit power levels used in subframes protected by cooperative coordination between base stations, and a second of the transmit power levels corresponding to unprotected subframes; and
    transmitting an uplink channel of the LTE network with one of the transmit power levels in accordance with a scheduled subframe type.

6. The method of claim 5, further comprising receiving an indication of which transmit power level to use.

7. The method of claim 6, in which the indication comprises upper layer signaling.

8. The method of claim 6, in which the indication comprises physical downlink control channel (PDCCH) signaling.

9. The method of claim 6, in which the indication includes an uplink subframe scheduling assignment including a parameter indicating a power offset for a modulation and coding scheme (MCS), the modulation and coding scheme parameter comprising one of a backoff value to be applied to the transmit power level and a dynamically varying modulation and coding scheme parameter.

10. The method of claim 5, in which the transmitting comprises transmitting a physical uplink control channel (PUCCH).

11. The method of claim 10, further comprising receiving a message indicating whether the transmit power of at least one of a channel quality indicator (CQI) message and a scheduling request (SR) will be based on a first power spectral density set point.

12. The method of claim 10, further comprising receiving a downlink grant indicating whether the transmit power of an acknowledgment (ACK) message will be based on a first power spectral density set point.

13. An apparatus for power control in a long term evolution (LTE) network, comprising:
    means for configuring a user equipment (UE) with a plurality of transmit power levels, each transmit power level corresponding to a subframe type, a first of the plurality of transmit power levels used in subframes protected by cooperative coordination between base stations, and a second of the transmit power levels corresponding to unprotected subframes; and
    means for scheduling the UE to transmit in accordance with the configured transmit power levels.

14. The apparatus of claim 13, further comprising configuring the UE based on a separate power control loop for each subframe type.

15. An apparatus for power control in a long term evolution (LTE) network, comprising:
    means for maintaining a plurality of transmit power levels at a user equipment (UE), each transmit power level corresponding to a subframe type, a first of the plurality of transmit power levels used in subframes protected by cooperative coordination between base stations, and a second of the transmit power levels corresponding to unprotected subframes; and
    means for transmitting an uplink channel of the LTE network with one of the transmit power levels in accordance with a scheduled subframe type.

16. The apparatus of claim 15, further comprising means for receiving an indication of which transmit power level to use.

17. The apparatus of claim 16, in which the indication includes an uplink subframe scheduling assignment including a parameter indicating a power offset for a modulation and coding scheme (MCS), the modulation and coding scheme parameter comprising one of a backoff value to be applied to the transmit power level and a dynamically varying modulation and coding scheme parameter.

18. An apparatus for power control in a long term evolution (LTE) network, comprising:
a memory; and
at least one processor coupled to the memory and configured:
to configure a user equipment (UE) with a plurality of transmit power levels, each transmit power level corresponding to a subframe type, a first of the plurality of transmit power levels used in subframes protected by cooperative coordination between base stations, and a second of the transmit power levels corresponding to unprotected subframes; and
to schedule the UE to transmit in accordance with the configured transmit power levels.

19. The apparatus of claim 18, in which the processor is further configured to configure the UE based on a separate power control loop for each subframe type.

20. The apparatus of claim 18, in which the processor is further configured to compute power control commands for each subframe type; and
to transmit the computed power control commands to the UE in accordance with a scheduled subframe type.

21. The apparatus of claim 18, in which the processor is further configured to indicate to the UE a transmit power set point based on subframe type.

22. An apparatus for power control in a long term evolution (LTE) network, comprising:
a memory; and
at least one processor coupled to the memory and configured:
to maintain a plurality of transmit power levels at a user equipment (UE), each transmit power level corresponding to a subframe type, a first of the plurality of transmit power levels used in subframes protected by cooperative coordination between base stations, and a second of the transmit power levels corresponding to unprotected subframes; and
to transmit an uplink channel of the LTE network with one of the transmit power levels in accordance with a scheduled subframe type.

23. The apparatus of claim 22, in which the processor is further configured to receive an indication of which transmit power level to use.

24. The apparatus of claim 23, in which the indication comprises upper layer signaling.

25. The apparatus of claim 23, in which the indication comprises physical downlink control channel (PDCCH) signaling.

26. The apparatus of claim 23, in which the indication includes an uplink subframe scheduling assignment including a parameter indicating a power offset for a modulation and coding scheme (MCS), the modulation and coding scheme parameter comprising one of a backoff value to be applied to the transmit power level and a dynamically varying modulation and coding scheme parameter.

27. The apparatus of claim 22, in which the processor is further configured to transmit by transmitting a physical uplink control channel (PUCCH).

28. The apparatus of claim 27, in which the processor is further configured to receive a message indicating whether the transmit power of at least one of a channel quality indicator (CQI) message and a scheduling request (SR) will be based on a first power spectral density set point.

29. The apparatus of claim 27, in which the processor is further configured to receive a downlink grant indicating whether the transmit power of an acknowledgment (ACK) message will be based on a first power spectral density set point.

30. A computer program product for wireless communications in a wireless network, comprising:
a computer-readable medium having non-transitory program code recorded thereon, the program code comprising:
program code to configure a user equipment (UE) with a plurality of transmit power levels, each transmit power level corresponding to a subframe type, a first of the plurality of transmit power levels used in subframes protected by cooperative coordination between base stations, and a second of the transmit power levels corresponding to unprotected subframes; and
program code to schedule the UE to transmit in accordance with the configured transmit power levels.

31. A computer program product for wireless communications in a wireless network, comprising:
a computer-readable medium having non-transitory program code recorded thereon, the program code comprising:
program code to maintain a plurality of transmit power levels at a user equipment (UE), each transmit power level corresponding to a subframe type, a first of the plurality of transmit power levels used in subframes protected by cooperative coordination between base stations, and a second of the transmit power levels corresponding to unprotected subframes; and
program code to transmit an uplink channel of the LTE network with one of the transmit power levels in accordance with a scheduled subframe type.

* * * * *